(12) United States Patent
Lang et al.

(10) Patent No.: US 10,995,862 B2
(45) Date of Patent: May 4, 2021

(54) VALVE SERIES HAVING DIFFERENT FLOW CAPACITIES AND UNIFORM VALVE ACTUATORS

(71) Applicant: KARL DUNGS GMBH & CO. KG, Urbach (DE)

(72) Inventors: Martin Lang, Leutenbach (DE); Benjamin Bös, Schorndorf (DE); Nils Obermöller, Schorndorf (DE)

(73) Assignee: KARL DUNGS GMBH & CO. KG, Urbach (DE)

( * ) Notice: Subject to any disclaimer, the term of this patent is extended or adjusted under 35 U.S.C. 154(b) by 45 days.

(21) Appl. No.: 16/084,102

(22) PCT Filed: Mar. 11, 2016

(86) PCT No.: PCT/EP2016/055368
§ 371 (c)(1),
(2) Date: Sep. 11, 2018

(87) PCT Pub. No.: WO2017/153003
PCT Pub. Date: Sep. 14, 2017

(65) Prior Publication Data
US 2019/0072188 A1 Mar. 7, 2019

(51) Int. Cl.
*F16K 1/44* (2006.01)
*F16K 31/04* (2006.01)
*F16K 1/00* (2006.01)

(52) U.S. Cl.
CPC ............... *F16K 1/443* (2013.01); *F16K 1/00* (2013.01); *F16K 31/047* (2013.01)

(58) Field of Classification Search
CPC ........... F16K 1/443; F16K 1/00; F16K 31/047
See application file for complete search history.

(56) References Cited

U.S. PATENT DOCUMENTS

| 4,895,126 A | 1/1990 | Nishimiya et al. |
| 2007/0200081 A1* | 8/2007 | Elizarov et al. .. B01L 3/502707 251/331 |

(Continued)

FOREIGN PATENT DOCUMENTS

| CL | 201802586 | 9/2018 |
| CL | 201802587 | 9/2018 |

(Continued)

OTHER PUBLICATIONS

Chinese First Office Action dated Aug. 28, 2019 and Search Report dated Aug. 20, 2019, in corresponding Chinese Application No. 201680083392.X, with English translation (17 pages).

(Continued)

*Primary Examiner* — Kevin L Lee
(74) *Attorney, Agent, or Firm* — Fitch, Even, Tabin & Flannery LLP

(57) ABSTRACT

The valve series includes a plurality of valve types (A, B, C) with valves of different size and type, wherein a plurality of valve types, preferably all valves types (A, B, C) of the valve series (11) have uniform valve actuators (21), wherein the valve closure members (19) of the valves (10, 12, 13) perform the same opening stroke, wherein they can be formed differently, however, and in particular can have different diameters. The closing springs (20) of the different valve types (A, B, C) can also have different characteristic curves and can be of different thicknesses.

12 Claims, 2 Drawing Sheets

(56) References Cited

U.S. PATENT DOCUMENTS

| | | | |
|---|---|---|---|
| 2008/0099081 A1 | 5/2008 | Yamamoto | |
| 2013/0181152 A1 | 7/2013 | Naumann et al. | |
| 2015/0122349 A1* | 5/2015 | Johnson | F16K 31/1223 137/315.11 |
| 2016/0061337 A1* | 3/2016 | Teller et al. | F02M 37/0064 137/10 |

FOREIGN PATENT DOCUMENTS

| | | |
|---|---|---|
| CN | 2154934 Y | 2/1994 |
| CN | 201013906 Y | 1/2008 |
| CN | 202629093 U | 12/2012 |
| DE | 2911949 A1 | 10/1980 |
| DE | 102005058846 A1 | 6/2007 |
| DE | 202010003659 U1 | 7/2010 |
| DE | 102009012405 A1 | 9/2010 |
| EP | 1992854 A2 | 11/2008 |
| EP | 2228573 A1 | 9/2010 |
| EP | 2228573 B1 | 11/2013 |
| EP | 3426953 A1 | 1/2019 |
| GB | 2038998 A | 7/1980 |
| JP | S59-009373 A | 1/1984 |
| JP | S60-106393 A | 6/1985 |
| JP | H05-187569 A | 7/1993 |
| JP | 2002-131098 A | 5/2002 |
| JP | 2002-250468 A | 9/2002 |
| JP | 2006-070946 A | 3/2006 |
| JP | 2016-205463 A | 12/2016 |
| JP | 2019-511195 A | 4/2019 |
| RU | 2536438 C1 | 12/2014 |
| SU | 54440 A1 | 11/1938 |
| WO | 2017153003 A1 | 9/2017 |

OTHER PUBLICATIONS

International Search Report dated Nov. 17, 2016, for corresponding PCT Application No. PCT/EP2016/055368 (4 pgs.).

Japanese Notice of Reasons for Refusal, dated Dec. 26, 2019, in corresponding Japanese Application No. 2018-566630, with English translation (13 pages).

Chilean Office Action dated Dec. 10, 2019, in corresponding Chilean Application No. 201802588, with English translation (15 pages).

Russian Office Action dated Aug. 27, 2019, in corresponding Russian Application No. 2018134795/06(057292) (6 pages).

* cited by examiner

VALVE SERIES HAVING DIFFERENT FLOW CAPACITIES AND UNIFORM VALVE ACTUATORS

CROSS REFERENCE TO RELATED APPLICATIONS

This patent application is the national phase of PCT/EP2016/055368, filed Mar. 11, 2016.

TECHNICAL FIELD

The invention relates to a valve series, in particular a series of gas valves which have different sizes.

BACKGROUND

Valve component sets and valve series are known in principle. Reference is made by way of example to DE 20 2010 003 659 U1, which describes a valve component set with a device for recognising the end position. There, all valves of the valve series with different sizes are equipped with identical printed circuit boards.

Document DE 10 2005 058 846 A1 additionally discloses a modular valve system with electromagnetically actuated valve. It is provided there to use a uniform coil system for different valves.

In addition, self-closing motorised control valves are known, as can be inferred for example from DE 10 2009 012 405 A12. The motorised actuator comprises a servomotor, which acts on the valve closure member via a reduction gearing and a flexible tension means. A closing spring tensions the valve closure member in the closing direction, wherein the closing spring has to apply a sufficient force to overcome all friction moments of the reduction gearing and the rolling moment or cogging torque of the servomotor so that the valve closure member in the currentless state of the actuator moves reliably into the closed position. This requirement exists in particular in the case of gas valves, which by all means have to close reliably. The strength of the closing spring is dependent, however, on the valve size and the valve stroke. Thus, within a valve series, valve actuators of different thickness or different size are normally provided for valves of different size, which constitutes a significant technical outlay.

The object of the invention is to specify a concept with which valves of a valve series can be provided with reduced technical outlay.

SUMMARY

The valve series according to the invention comprises various valve types of different size, wherein each valve type of the valve series comprises a linearly movable valve closure member, which is paired with a valve seat, a closing spring, and a valve actuator. The valve actuator of all valve types is formed in a uniform manner and provides a uniform maximum stroke. Accordingly, the valve closure members of the relevant valve types likewise have the same uniform maximum stroke, i.e. they have the same distance between the closed position and open position. This is independent of the size of the valve closure members of the valve types involved. Valve types of smaller size can comprise, specifically, valve closure members with a smaller diameter, whereas valve types of larger size can comprise valve closure members of larger diameter. Different valve types within the same series can also comprise valve closure members of different shapes (plate, cone, single seat, double seat. etc.).

The valve actuators of all relevant valve types are preferably formed uniformly on the whole, i.e. can also be exchanged for one another. However, the closing springs of different valve types can be different from one another. In particular, it is possible to provide that the closing springs in the closed position apply different closing forces, i.e. that they press the valve closure members against the valve seat with different forces. However, the closing springs preferably have the same closing forces in the open position. For example, the valves of smaller size thus have a steeper force-path characteristic curve, and the valves of larger size have a flatter force-path characteristic curve. It can thus be achieved that in the case of smaller valve closure members the involved seals at the valve closure member are not overloaded. However, the closing force is in any case great enough that frictional and cogging torques present in the valve actuator can be reliably overcome by the closing spring in each valve of the series. By contrast, the uniformity of the closing force in the open position of the valve closure members in all valve types ensures that the uniform actuator in any case can apply the necessary holding moment to hold the valve closure member in the open position, without the need for any modifications at the actuator. All actuators can have the same stepper motors, the same trigger circuitries, the same gearing with the same gearing reduction, and the same connections, and therefore certainly can be exchanged for one another. In addition, the uniform closing spring force in the open position means that the valve actuators are accelerated in the same way in the closing direction when they are switched off, and a largely uniform closing speed is thus achieved across valves of different sizes.

The valve actuator can comprise a stepper motor as motor, which stepper motor is connected to the valve closure member via a reduction gearing and a tension means, for example a chain. The design of the tension means in the form of a chain or other flexible tension means has the advantage that the valve closure member, during the closing process, is decoupled in terms of drive from the motor and the gearing as it is placed against the valve seat, such that the vibration moment present in the motor and gearing does not act on the valve closure member and/or the valve seat and therefore also cannot have a disruptive effect. However, other decoupling means can also be used, for example a free-running or neutral position, which allows the motor to come to a stop.

The valve actuator preferably comprises a trigger circuitry for the stepper motor and a damping circuitry for the rapid-closure movement, wherein the trigger circuitry and the damping circuitry furthermore are preferably also designed identically in all valve types of the series. Ultimately, there is thus also no need for any electronic or program-related adaptation of the valve actuators to the different valve types, which not only offers logistical advantages, but also significantly reduces the frequency of errors caused by mixing up valve actuators in the field, for example when exchanging the valve actuators in the case of valves of different size, and therefore significantly simplifies the maintenance.

The valve actuator preferably comprises an electronic damping device. This is preferably formed by a capacitive damping circuit. The motor of the valve actuator is preferably a permanently excited stepper motor, which together with the capacitive damping circuit forms a resonance arrangement. The steep gradient of the currents produced with closing of the valve in the generator operation of the stepper motor in the resonance circuit thus formed as the resonance frequency is approached leads to a non-linear inhibiting or damping behaviour, such that a largely uniform closing speed of the valves can be ensured in the case of automatic shut-off, wherein the closing speed is dependent only on the force of the closing spring. The valve types of the valve series thus have a largely uniform closing speed.

The method according to the invention for providing a valve series is likewise based on the concept of using uniform valve actuators for valve types of different size. The valve actuators for all valve types of a series are preferably provided in a manner non-specific to valve type, such that valves of different valve types within the series differ on the drive side merely by the gradient of the characteristic curve of the valve springs. The valve strokes are preferably uniform within the series. The valve disc diameter of different valve types of the series are preferably all different, whereas the valve strokes are preferably all the same.

BRIEF DESCRIPTION OF THE DRAWINGS

Details of different embodiments of the invention are the subject of dependent claims, the drawings, and the description. In the drawings:

DETAILED DESCRIPTION

Figures 1, 2:
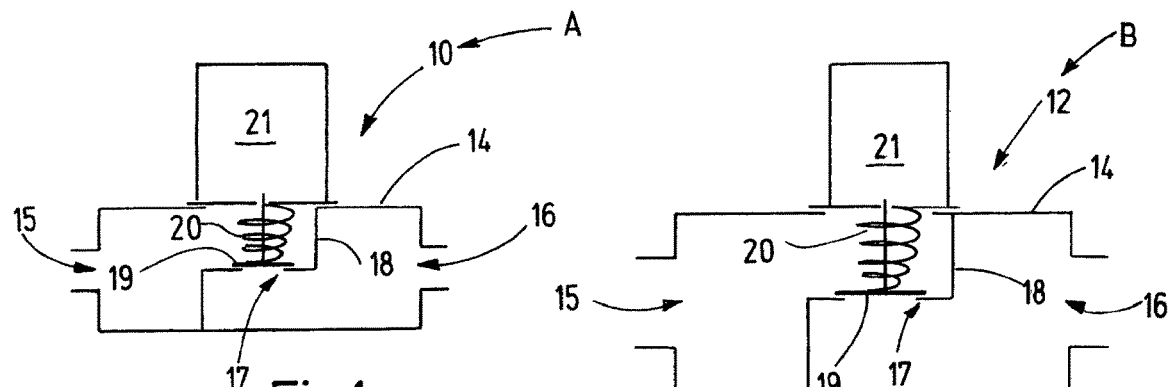
FIGS. 1 to 3 show different valve types A, B, C, also of different size, in a schematic sectional illustration.
Figures 3, 4:
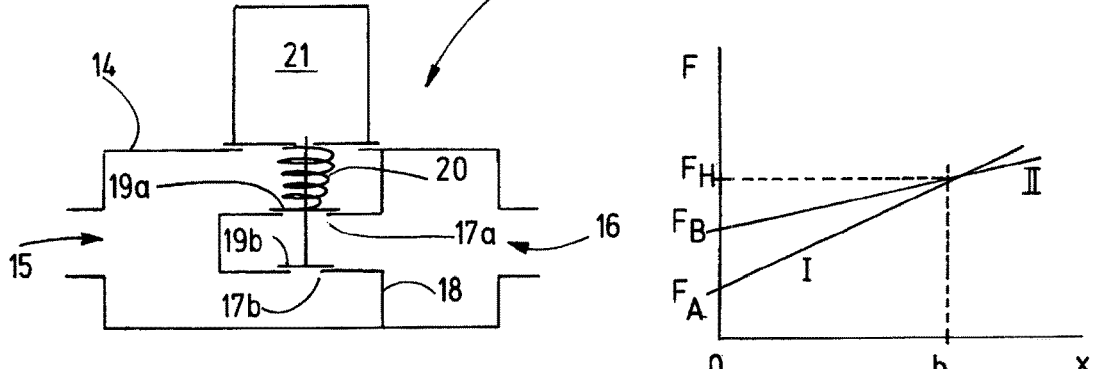
FIG. 4 shows characteristic curves of closing springs of different valve types of the series.

FIG. 1 shows a valve 10 which represents a first valve type A and belongs to a valve series 11 extending over FIGS. 1, 2 and 3. FIGS. 2 and 3 show valves 12 and 13, which embody further valve types B, C of the valve series 11.

The series 11 comprises at least two, but preferably a plurality of valve types A, B of the same design. This series can also comprise a further valve type C, or also a plurality of further valve types. The valve types A, B, C can differ in many respects. For example, they can have different nominal flow rates, as can be seen from a comparison of valves 10 and 12 or valve types A and B. It is also possible that the series 11 comprises a plurality of valves with the same nominal flow rates, but different connection flanges.

Each valve 10, 12, 13 of the series 11 comprises a valve housing 14 with an input connection 15 and an output connection 16. The valves 10, 12, 13 can differ with regard to the width of the input and output connections 15, 16 and also with regard to the design of these connections. The valve series 11 for example can also comprise valve types with the same nominal flow rate, but different flange types (pipe flange, screw connection, etc.). In particular, however, the valve housing 14 can be provided in different sizes and can have other differences, in particular different nominal diameters (¼ inch, inch, 1 inch, 1 inch and in particular several inches).

Figure 6:
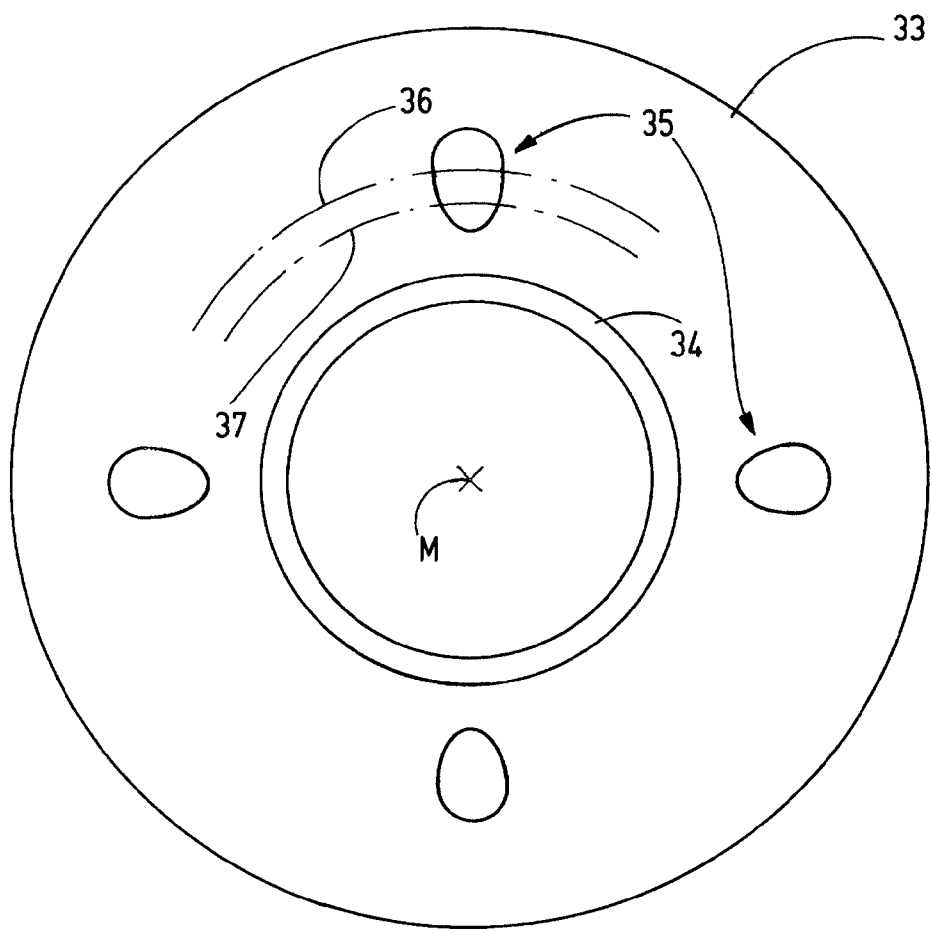
FIG. 6 shows a flange of a valve that can be used in a manner encompassing all standards.

It is also possible to provide the valve housing of at least one of the valve types (for example valve type A), a plurality of valve types (A, B), or all valve types (A, B and others, and as appropriate C) with flanges 33 which fit in at least two standards systems. A (universal) flange 33 of this kind is shown separately in FIG. 6. It is formed by a disc-shaped portion of the valve housing 14 and for example has a planar sealing face 34. Holes 35 (for example 4, 8 or another standard number) are arranged around said sealing face, concentrically with the circle thereof. The fastening holes preferably are not circular. Rather, they have a first (for example radially outer) end with a larger diameter and a second (for example radially inner) end with a smaller diameter, such that an egg shape is produced on the whole. Identical diameters are also possible, such that an oval-shaped is produced for each of the holes 35. The two centres of the two ends lie over different hole circles 36, 37 concentric with the centre point M and preferably additionally over radial lines passing through the centre point M. The first hole circle 36 and the first hole diameter can correspond to a first standard, whereas the second hole circle 37 and the second hole diameter can correspond to a second standard. The flanks of the holes can be straight or, in the case of larger diameter differences between the hole circle diameters, can also be curved (protruding inwardly), such that 8-shaped holes are provided.

Each valve housing 14 contains at least one valve seat 17 in the form of a preferably round passage in a partition wall 18, wherein, as shown in FIG. 3, a plurality of valve seats 17a, 17b, of the same or different size can be provided, which are preferably arranged concentrically with one another. The valve seats 17, 17a, 17b are paired with valve closure members 19, 19a, 19b, which in the closed position each rest on the paired valve seat 17, 17a, 17b respectively. The valve closure members 19, 19a, 19b can be moved away from respective valve seats 17, 17a, 17b against the force of a closing spring 20. To this end, a valve actuator 21 is used, which is identical in terms of structure and dimensioning and preferably in terms of all details for the valves 10, 12, 13 of the valve series 11. The valve actuator 21 for example of the first valve 10 can thus be assembled without making any adaptations to the valve 12 or 13, and vice versa.

The valve closure members 19, 19a, 19b of the different valve types A, B, C can have different structures and diameters. For example, they can have different seal arrangements or also a different fundamental design, as can be seen by comparing valve types A and B on the one hand with valve type C on the other hand. The valve types can thus be single valves or double-seat valves with or without force balancing. Force balancing is provided in the case of valve type C in that the valve closure member 19a sits in front of the valve seat 17a with respect to the gas through-flow direction and the valve closure member 19b sits behind the valve seat 17b. The gas pressure loading the valve closure members 19a, 19b thus generates oppositely directed forces at the valve closure members 19a, 19b, which forces basically cancel one another out. This is by contrast with valve types A and B. There, the gas pressure applied on the input side contributes to the closing force of the closing spring 20.

The closing springs 20 can be formed differently in accordance with the different size and/or different function of the valves 10, 12, 13 of the valve types A, B, C. However, they are all formed with the same valve stroke, i.e. the same path that is travelled by the valve closure member 19 from its closed position, in which it sits on the valve seat 17, into its open position. FIG. 4 shows by way of example a first characteristic curve I for the valve type A and a second force-path characteristic curve II for the closing spring 20 of the second valve type B. The closed position of the valve closure member 19 can be found on the X-axis of the graph according to FIG. 4 at the position "0". The closing force $F_A$ applied by the closing spring 20 of the valve 10 is lower than the closing force $F_B$ of the closing spring 20 of the second valve 12. The closing force difference can correspond to the area difference of the valve seats 17 of the two valves 10 and 12.

The force-path characteristic curves I and II preferably have different gradients, wherein the gradient of the force-path characteristic curve I of the closing spring 20 of the smaller valve 10 is preferably steeper than the gradient of the force-path characteristic curve of the closing spring 20 of the larger valve 12. The gradients are preferably such that the force $F_H$ of the two closing springs 20 of the two different valves 10 and 12 in the open position is the same. The open position is that X-position h of the valve closure member 19 at which said member has passed through the maximum stroke and is in the open position. The valves of all types A, B, C have possibly differently formed valve closure members 19, 19a, 19b, which pass through the same stroke h, however, between the closed position and open position.

Figure 5:
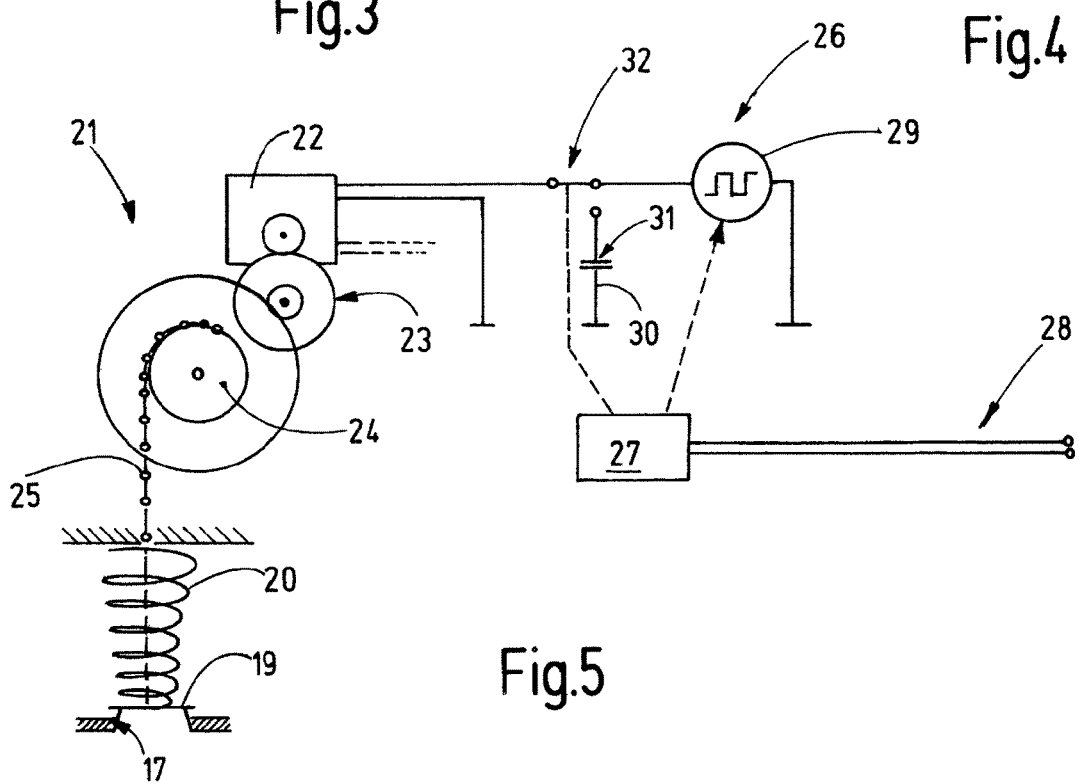
FIG. 5 shows the valve actuator, in a schematically functional block illustration.

The uniformly formed valve actuator 21 is shown separately in FIG. 5. It includes in particular an electric motor 22, which is preferably formed as a permanently excited stepper motor. The stepper motor 22 drives a reduction gearing 23 by means of its driveshaft, which gearing is preferably formed as a spur gearing and does not have self-locking. The reduction gearing 23 is connected to a winding wheel, in particular a chain wheel 24, which can wind or unwind a flexible tension means by rotation, in the case of a chain wheel 24 a chain 25. Here, the rotation of the winding wheel 25 is preferably limited to less than 360°. The tension means, in particular the chain 25, is connected at one end to the winding wheel 24. With the other end, the chain 25 or the other tension means is connected to the valve closure member 19 or a valve spindle connected thereto, so as to pull the valve closure member 19 away from the valve seat 17 against the force of the closing spring 20 when the valve actuator 21 is activated.

The stepper motor 27 is preferably at least 2-phase. FIG. 5 shows the trigger circuitry in respect of one phase. The trigger circuitry for the second phase of the stepper motor is formed accordingly, but is not shown in further detail in FIG. 5.

The trigger circuitry 26 includes a control device 27, which converts a direct or alternating voltage (for example 24 V control voltage or 230 V control voltage) coming from the input connections 28 of the valve actuator 21 into trigger pulses for the stepper motor 22. A corresponding inverter circuitry 29 is shown in FIG. 5 merely schematically as source. This typically adjusts the current quasi sinusoidally, such that smooth running of the motor without interfering vibrations by hard steps is made possible. Reference is then made to what is known as microstepping operation, with typically 16 and up to 256 sample points per quarter wave.

The trigger circuitry 26 also includes a damping circuit 30, which contains at least one capacitor 31. A switchover means 32 is for this purpose provided in order to connect the winding of the stepper motor 22 alternatively to the inverter circuitry 29 or the braking circuit 30. The switchover means 32 is controlled by the control circuitry 27. It can be formed as a switchover relay or as an electronic switch.

The valve series 11 according to the invention comprises differently formed valves 10, 12, 13 with uniform valve actuators 21. The provision of the valves 10, 12, 13 of the valve series 11 thus comprises the provision of a different valve housing 14 with the valve closure members 19, 19a, 19b and closing springs 20 paired therewith provided in said housing accordingly. The valve housing and valve closure members and valve springs provided previously are typically specific for the valve type A, valve type B or valve type C. However, just one single actuator type in the form of the valve actuators 21 is provided for all valve types A, B and C and is not subjected to any individualisation.

In the rest position the valve closure member sits on the valve seat 17 as a result of the force exerted by the closing spring 20. If the valve actuator 21 is now supplied with voltage at its connection 28, the inverter circuitry 29 is activated. At the same time, the switchover means 32 is in the position shown in FIG. 5, in which it connects the stepper motor 22 to the inverter circuitry 29. The stepper motor 22 now runs in the open position and stops there. This can be controlled by counting the step pulses output by the inverter 29 or by position sensors, which are mounted on the valve actuator 21 and/or at another point of the valve 10, 12 or 13.

If the valve 10, 12 or 13 is to be closed, the connection 28 is switched to a currentless state. In this case the switchover means 32 will also separate the connection between the inverter circuitry 29 and the stepper motor 22 and will connect the latter for this purpose to the damping circuit 30. If the switchover means 32 is formed as a relay, the relay is currentless and the switchover means 32 passes from the working position shown in FIG. 5 into its rest position, in which it connects the damping circuit to the stepper motor 22.

In this state the closing spring 20 drives the valve closure member 19 in the closing direction and in so doing rotates the stepper motor 22 working in generator operation. The alternating voltage created at its windings causes a current through the capacitor 31. This forms a resonance circuit together with the coil inductance of the stepper motor 22. As soon as the frequency of the current flowing through the damping circuit approaches the resonance frequency of this resonance circuit, an increasing counter torque of the stepper motor 22 is created, such that this is decelerated overproportionally with increasing speed. The motor speed is thus limited, such that the valve 10, 12, 13 closes quickly, but not in an unbraked manner and certainly not abruptly. Due to the speed-stabilising effect of the resonance circuit, the drop in spring force in accordance with the force-path characteristic curve I in smaller valve types plays a subordinate role. These also close quickly. On the other hand, valves with stronger springs for example in accordance with the force-path characteristic curve II do not close excessively quickly. The non-linear braking effect of the resonance circuit compensates for various spring forces, such that the speeds of the stepper motors 22 of identical valve actuators with different closing springs remain within a narrow tolerance band.

The valve series according to the invention comprises a plurality of valve types A, B, C with valves of different size, wherein a plurality of valve types, preferably all valve types A, B, C of the valve series 11 have uniform valve actuators 21, wherein the valve closure members 19 of the valves 10, 12, 13 perform the same opening stroke, wherein they can be formed differently, however, and in particular can have different diameters. The closing springs 20 of the various valve types A, B, C can also have different characteristic curves and can be of different thicknesses.

REFERENCE SIGNS

| | |
|---|---|
| 10 | first valve |
| A | first valve type |

-continued

| 11 | valve series |
| --- | --- |
| 12 | second valve |
| 13 | third valve |
| B, C | second and third valve type |
| 14 | valve housing |
| 15 | input connection |
| 16 | output connection |
| 17, 17a, 17b | valve seats |
| 18 | partition wall |
| 19, 19a, 19b | valve closure member |
| 20 | closing spring |
| 21 | valve actuator |
| I, II | force-path characteristic curves |
| $F_A$ | closing force of the closing spring 20 of the first valve 10 |
| $F_B$ | closing force of the closing spring 20 of the second valve 12 |
| $F_H$ | force of the closing springs 20 in the open position |
| 22 | stepper motor |
| 23 | reduction gearing |
| 24 | winding wheel |
| 25 | chain/flexible tension means |
| 26 | trigger circuitry |
| 27 | control circuitry |
| 28 | connection |
| 29 | inverter circuitry |
| 30 | damping circuit |
| 31 | capacitor |
| 32 | switchover means |
| 33 | flange |
| 34 | sealing face |
| 35 | holes |
| 36 | first hole circle |
| 37 | second hole circle |

The invention claimed is:

1. A valve series (11) comprising a plurality of valve types (A, B, C) of different size with respect to flow capacity,
wherein each valve type (A, B, C) of the valve series (11) comprises a linearly movable valve closure member (19), which is paired with a valve seat (17), a closing spring (20) and a valve actuator (21);
wherein the valve actuator (21) is an electric drive that is uniform across each of the valve types (A, B, C) and configured to provide a uniform maximum stroke (h);
wherein the closing springs (20) of at least two of the valve types (A, B, . . . ) have different characteristic curves (I, II);
wherein the closing springs (20) of the at least two of the valve types (A, B, . . . ) are designed to apply different closing forces when the valve closure members (19) of the at least two of the valve types (A, B, . . . ) are sitting on the valve seats (17);
wherein the closing springs (20) of a first valve type (A) of the valve types having a smaller valve seat diameter has a steeper force-path characteristic curve (I) than the closing springs (20) of other (B) of the valve types having a larger valve seat diameter.

2. The valve series according to claim 1, wherein the closing springs (20) of the at least two of the valve types (A, B, . . . ) are designed to apply identical closing forces when the valve closure members (19) of the at least two of the valve types (A, B, . . . ) are in an open position.

3. The valve series according to claim 1, wherein the valve actuator (21) is configured to apply a self-locking force that is lower than a closing force of the closing springs (20) of each valve type (A, B, C) of the valve series (11).

4. The valve series according to claim 3, wherein the valve actuator (21) is configured to apply the self-locking force that is lower than the closing force of the closing spring (20) when the valve is closed.

5. The valve series according to claim 1, wherein the valve actuator (21) comprises a stepper motor (22) which is connected directly or indirectly to the valve closure member (19) via a reduction gearing (23) and a tension means (25).

6. The valve series according to claim 5, wherein the stepper motor (22) of the valve actuator (21) is paired with a control device (27) which comprises an electric damping circuitry (30).

7. The valve series according to claim 6, wherein the electric damping circuitry (31) of the valve actuators (21) of all valve types (A, B, C) is dimensioned identically.

8. The valve series according to claim 6, wherein the electric damping circuitry (31) comprises at least one capacitive braking circuit.

9. The valve series according to claim 1, wherein the closing springs (20) of valve type (A) of the valve types having a single valve seat (17) have a steeper force-path characteristic curve (I) than the closing springs (20) of valve type (C) of the valve types having a double valve seat (17a, 17b).

10. A method for providing a valve series comprising a plurality of valve types (A, B, C) of different size, said method comprising:
providing valves (10, 12, 13) of different types (A, B, C) and size with respect to flow capacity, wherein each valve of the valve series comprises a linearly movable valve closure member (19) and a valve seat (17),
providing closing springs (20) in a manner specific to valve type, such that the closing springs (20) of at least two valve types (A, B) of the plurality of valve types (A, B, C) of the valve series differ, wherein the closing springs (20) of a first valve type (A) of the valve types having a smaller valve seat diameter has a steeper force-path characteristic curve (I) than the closing springs (20) of other (B) of the valve types having a larger valve seat diameter,
providing uniform valve actuators (21) comprising electric drives having a uniform maximum stroke (h),
joining together the valves (10, 12, 13), the closing springs (20) and the uniform valve actuators (21).

11. The method according to claim 10, wherein the providing the uniform valve actuators (21) comprises providing the uniform valve actuators (21) in a manner non-specific to valve type.

12. The method according to claim 10, wherein the providing the uniform valve actuators (21) comprises providing the uniform valve actuators containing damping circuitries (31, 32) for damping the closing movement in a manner non-specific to valve type.

* * * * *